April 28, 1959  C. F. KING, JR  2,884,285
SEAL FOR BEARINGS
Filed Sept. 13, 1955
2 Sheets-Sheet 2
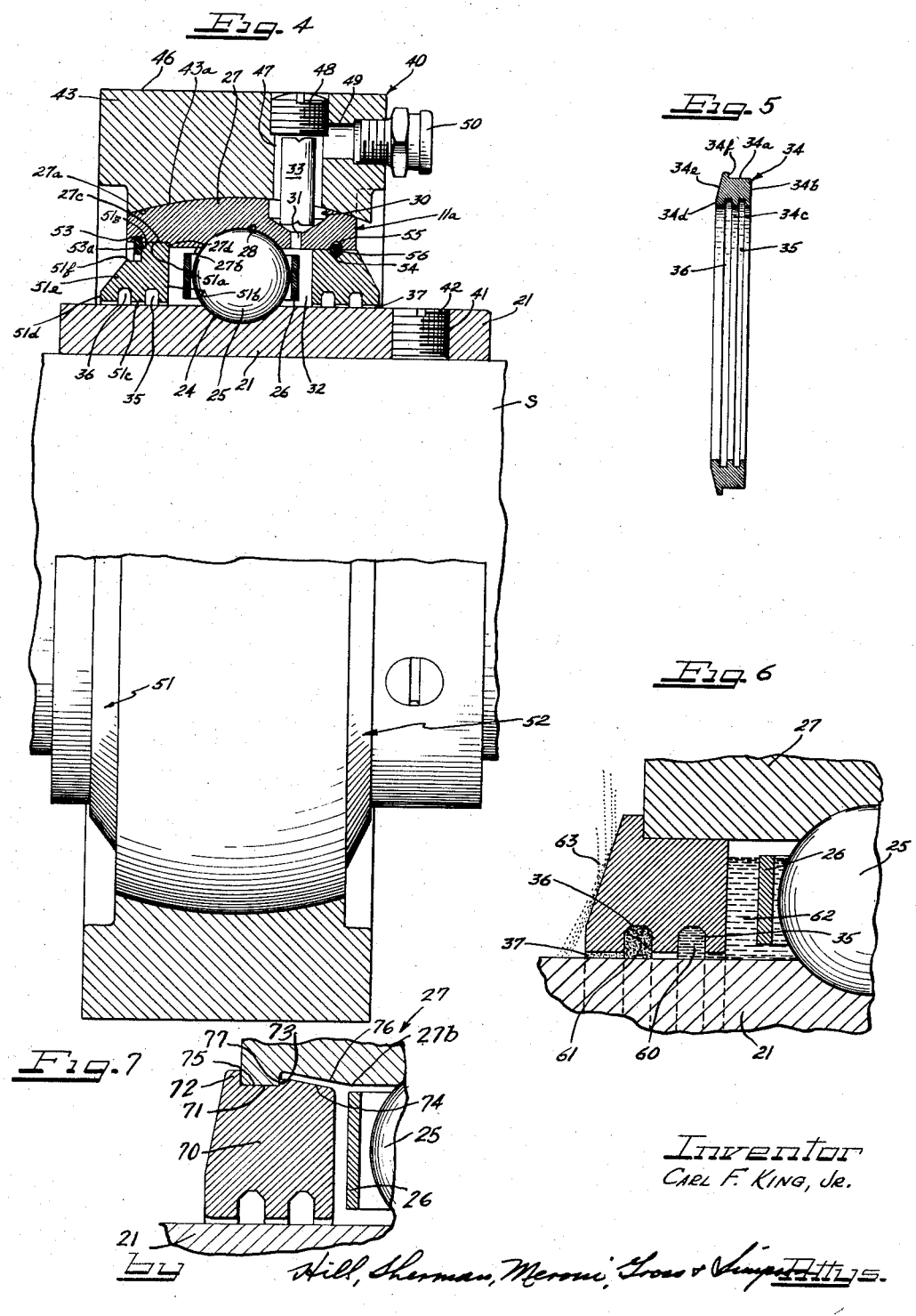
Inventor
CARL F. KING, JR.

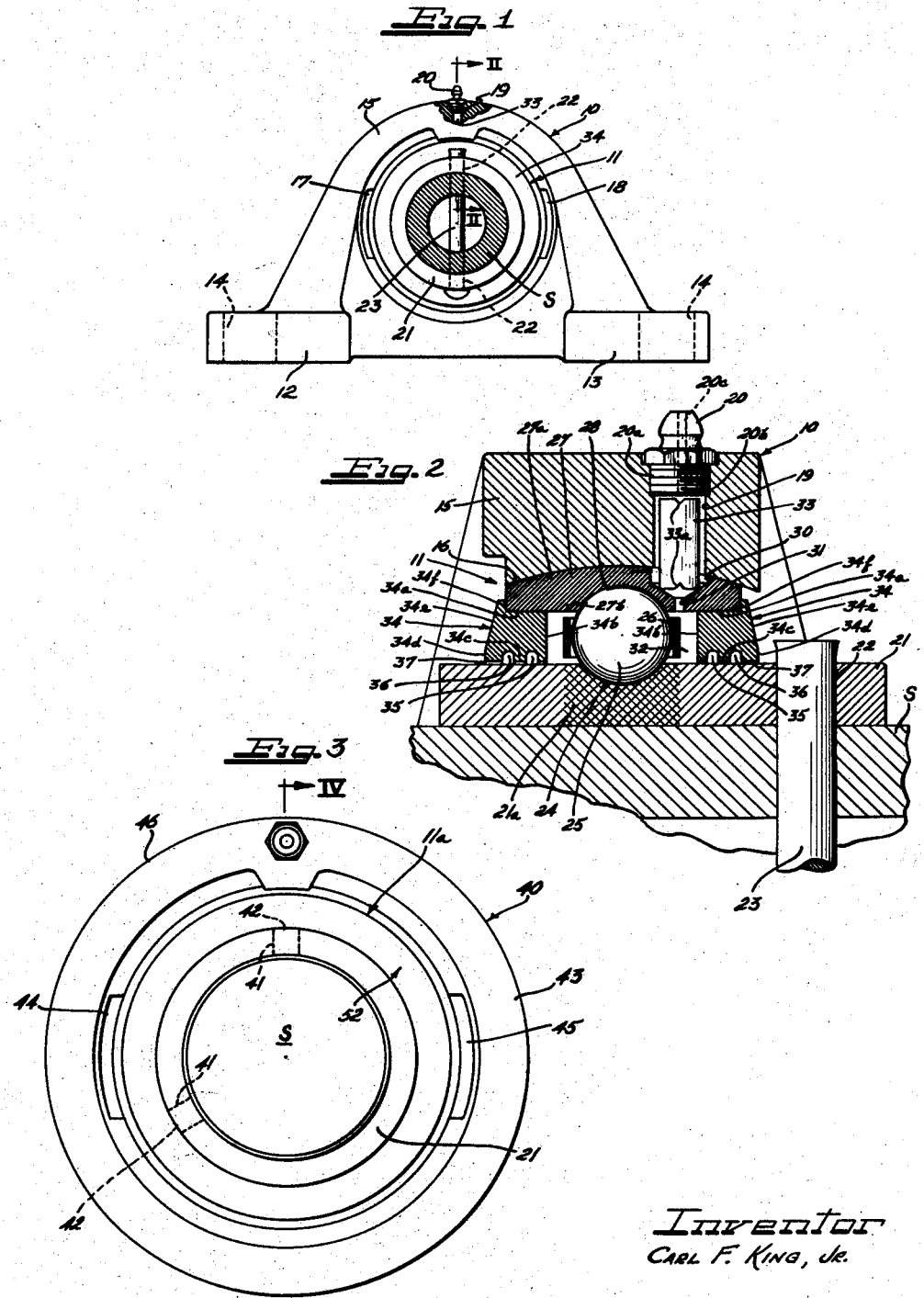

United States Patent Office 2,884,285
Patented Apr. 28, 1959

2,884,285

SEAL FOR BEARINGS

Carl F. King, Jr., Aurora, Ill., assignor to Stephens-Adamson Mfg. Co., Aurora, Ill., a corporation of Illinois Application September 13, 1955, Serial No. 534,066

2 Claims. (Cl. 308—187.2)

This invention relates to seals especially adapted for retaining grease in bearings and preventing entrance of dirt into the bearing chamber. Specifically, this invention relates to simple inexpensive ring seals for bearing units, such as ball bearing units, wherein grease, in attempting to leak out of the sealed unit, and dirt, in attempting to enter the sealed unit, cooperate to form an effective seal in one or more grooves provided by the seal rings.

This invention will hereinafter be specifically described as embodied in sealed ball bearing units of the pillow block and cartridge type, but it should be understood that the seals of this invention are generally useful in effectively sealing a chamber at least partly defined by a rotating member.

A feature of this invention resides in the utilization of sealed in lubricant and sealed out extraneous matter to form an effective seal.

In accordance with this invention, the outer race ring of a ball bearing unit carries a rigid seal ring which spans the gap between the inner and outer race rings of the bearing. This seal ring has an axial bore or inner circumferential wall in close running clearance relationship around the inner race ring. At least one, and preferably two or more, grooves are provided in the bore or inner circumferential wall of the seal ring. These grooves are adapted to be quickly filled with lubricant from the bearing chamber and this lubricant bridges the gap between the seal ring and the inner race ring. Any dirt which finds its way into the gap between the seal ring and the inner race ring will be blocked by the rib of grease projecting from the groove and may comingle with this grease to form a packing ring. Since centrifugal force of the rotating inner race ring tends to throw the grease and dirt into the groove, only a light rubbing contact or interference fit relationship will exist between the thus formed rib or packing ring and the inner race ring.

In its preferred form, the seal ring of this invention includes a first groove closely adjacent the bearing chamber and a second groove spaced outwardly from the first groove but inwardly from the outer face of the seal ring. In this arrangement, the first groove will rapidly fill with grease and the second groove will trap entering dirt before it can reach the second groove, thereby insuring the creation of an inner grease packing before dirt reaches the bearing chamber. During operation, grease from the first groove may flow outwardly to comingle with dirt in the second groove, and dirt in the second groove may flow inwardly to cooperate with grease in the first groove, thereby forming a pair of packing rings or sealing ribs. If desired, of course, one or more intermediate grooves can be provided between the first and second grooves.

The outer face of the seal ring of this invention is preferably inclined at an angle of from 10 to 15 degrees from a radial plane so that dirt will tend to cascade away from the entrance mouth of the gap between the bore or inner wall of the sealing ring and the inner race ring.

It is then an object of this invention to provide seal rings for bearings and the like which create packings from the material that is sealed and from extraneous matter attempting to enter the sealed chamber.

Another object of the invention is to provide a simple, inexpensive bearing seal which will not blow out when the bearing chamber is overloaded with grease.

A further object of the invention is to provide a simplified one-piece seal ring especially adapted for bearing units wherein grooves in the ring form packing seals or ribs from lubricant and extraneous matter.

Another object of this invention is to provide a rigid one-piece seal ring for bearings and the like which is carried by the outer race ring of the bearing, spans the gap between the inner and outer race rings of the bearing, has an axial bore surrounding the inner race ring in close running clearance relationship, and is equipped with two or more grooves in the bore wall to trap dirt and lubricant for forming packing rings having a light interference fit relationship with the inner race ring to effectively block leakage of lubricant and ingress of dirt to the bearing chamber.

A specific object of this invention is to provide a rigid one-piece bearing seal which has an axial bore equipped with a plurality of grooves, one of which is spaced closely adjacent the inner face of the ring, and the other of which is spaced inwardly from the outer face of the ring, wherein the outer face of the ring is inclined to cascade extraneous matter away from the bore.

Other and further objects of this invention will be apparent to those skilled in this art from the following detailed description of the annexed sheets of drawings which, by way of preferred examples, show several embodiments of the invention.

On the drawings:

Figure 1 is a side elevational view of a sealed bearing unit according to this invention mounted in a one-piece pillow block, a portion of which is broken away and shown in vertical cross-section to illustrate the locking pin arrangement;

Figure 2 is a cross-sectional view, with parts in elevation, taken along the line II—II of Figure 1;

Figure 3 is a view similar to Figure 1 but illustrating a cartridge type sealed bearing unit according to this invention;

Figure 4 is a cross-sectional view, with parts in elevation, taken along the line IV—IV of Figure 3, and illustrating two additional embodiments of the sealing ring of this invention;

Figure 5 is a detailed vertical cross-section of one of the sealing rings of this invention; and Figure 6 is an enlarged fragmentary sectional view illustrating the manner in which grease and dirt cooperate to build up packing rings or ribs in the seal ring of this invention.

Figure 7 is a fragmentary sectional view similar to Figure 6 but showing still another form of sealing ring of this invention.

As shown on the drawings:

In Figures 1 and 2, the reference numeral 10 designates generally a one-piece pillow block having a sealed bearing unit 11 mounted therein. As shown in Figure 1, the pillow block 10 has feet 12 and 13, with holes or slots 14 therein to receive bolts or other mounting devices, not shown, which are adapted to rigidly secure the pillow block to a supporting structure (not shown). The pillow block has an annular strap portion 15 formed intermediate the feet 12 and 13 and provided with a concave inner face 16 shown in Figure 2. The inner face 16 forms a tilting bearing wall for the sealed bearing unit 11.

As shown in Figure 1, slots or grooves 17 and 18 are formed in the strap portion 15 of the pillow block on the inner wall 16 thereof. These grooves permit horizontal or edgewise insertion of the bearing unit 11 into the pillow block. The bearing unit when thus inserted in the slots 17 and 18 can be rotated or tilted to an upright position to be seated and retained on the inner face 16 of the strap 15.

The top of the strap has a radial bore 19 therethrough receiving a lubricant fitting 20 in threaded relation therein. The lubricant fitting 20 has a threaded nipple portion 20a with a flat end face 20b disposed in the outer end of the bore 19. The fitting 20 has a lubricant conveying bore or passageway 20c extending axially therethrough and terminating in the end face 20b.

The bearing unit 11 includes an inner race ring 21 disposed around a shaft S. The ring 21 has a projecting end portion with holes 22 therethrough in diametrically opposite aligned relation. These holes receive a locking rivet 23 which extends through the holes and through a hole in the shaft S for securing the ring 21 in non-rotatable relation on the shaft S.

A circumferential groove is formed around the inner race ring 21 to provide a raceway 24 for a row of ball bearings 25. The ball bearings are held in spaced relation around the raceway 24 by a cage 26.

As indicated by the cross hatched lines, the area 21a of the inner race ring 21 surrounding the raceway 24 is locally hardened to resist wear while the remainder of the race ring 21 is in softer condition. The softer main body of the race ring 21 is adapted to withstand shear and shock and at the same time cushions the hardened area 21a.

The bearing unit 11 also has an outer race ring 27 in spaced concentric relation around the inner race ring 21 and equipped with an outer raceway 28 for the ring of balls 25. The ball bearing 25 thus holds the inner and outer race rings in spaced concentric relatively rotatable relation and the ball bearings cooperate with the raceway to prevent relative axial shifting of the inner and outer race rings.

The periphery of the outer race ring 27 has a convex surface 27a for seating on the internal concave inner face 16 of the strap 15. The two contacting faces 16 and 27a cooperate to tiltably mount the bearing unit 11 in the pillow block 10 while retaining the unit in the pillow block unless the unit is tilted into right angular relation with the strap portion of the pillow block whereupon the unit can be removed through the grooves or slots 17 and 18.

The outer race ring 27 has a well or closed perimeter dimple 30 formed therein in such a position as to be aligned with the bore 19 of the pillow block when the bearing unit is in an upright position as shown in Figures 1 and 2. This dimple 30 has a tapered bottom wall converging to a small diameter bore 31 discharging to the space 32 between the race rings and positioned closely adjacent the raceway 28. The space 32 is adapted to receive lubricant from the fitting 20.

A solid cylindrical locking pin 33 of smaller diameter than the bore 19 and the dimple 30 is seated on the bottom wall of the dimple and projects freely into the bore 19. Both ends of this locking pin 33 are transversely notched at 33a and the arrangement is such that the locking pin will not interfere with the flow of lubricant from the lubricant fitting 20 to the bore 31 but will hold the outer race ring 27 against creeping on the inner wall 16 of the pillow block. The pin can tilt and wobble in the bore 19 and dimple 30 so that the unit 11 can be tilted relative to the pillow block.

In accordance with this invention, the space 32 between the inner and outer race rings is effectively sealed against loss of lubricant and ingress of dirt by one-piece rigid sealing rings 34 pressed into both outer ends of the cylindrical bore 27b of the outer race ring 27. Each ring 34 spans the gap between the inner and outer race ring and has a close running spaced relationship around the inner race ring 21.

Each ring 34 has a cylindrical outer periphery 34a, a flat radially extending inner face 34b, a cylindrical inner bore 34c, a short radial outer face portion 34d, a longer inclined outer face portion 34e radially outward from the portion 34d and extending radially outward and axially inward at an angle of about 10–30 degrees, and a radial shoulder 34f beyond the outer periphery 34a. The bore 34c is provided with a first radial groove 35 closely adjacent the face 34b and a second radial groove 36 spaced inwardly from the face 34d. As will be more fully hereinafter explained, these grooves 35 and 36 fill up with lubricant from the chamber 32 which flows into the gap 37 between the inner race ring 21 and the bore 34c and also with dirt which enters this gap.

Packing rings composed of the lubricant and dirt are thus formed in the grooves and project radially inward therefrom to ride on and have an interference fitting relationship with the inner race ring 21. The rings 34 can be composed of any inert relatively rigid material such as metal, plastic, hard rubber or the like. A cold roll 52100 steel is preferred.

In the cartridge assembly 40 of Figures 3 and 4, the bearing unit 11a thereof is substantially identical with the unit 11 of Figures 1 and 2 and corresponding parts have been identified by the same reference numerals. Instead of providing diametrically opposed rivet receiving holes on the extended end of the inner race ring 21, in the bearing unit 11a, internally threaded holes 41 are provided in 120 degree offset relationship. These holes receive set screws 42 which are threaded therethrough to lock against the shaft S by biting into the shaft, thereby uniting the inner race ring and shaft for co-rotation in place of the rivet 23.

The unit 11a is tiltably disposed within a cartridge ring 43 having a concave fragmental spherical inner bearing wall 43a receiving the convex outer peripheral wall 27a of the bearing unit 11a in the same manner as in Figures 1 and 2. Slots or grooves 44 and 45 are provided in the wall 43a to accommodate the bearing unit so that it can be tilted into the ring 43. The outer periphery 46 of the cartridge ring 43 is cylindrical, adapting the ring to be fitted into any suitable housing or part having a straight cylindrical bore or cavity. The locking pin 33 is seated in a radial bore 47 of the ring 43 and the outer end of this bore is closed by a plug 48 which is threaded therein. The bore 47 is joined with a bore 49 extending through the front face of the cartridge ring and this bore 49 receives a lubricant fitting 50 in threaded relation therein. Lubricant from the fitting is guided through the bore 49 into the bore 47 and thence through the dimple and bore 31 into the space between the inner and outer race rings. In this arrangement, the lubricant connection is at a front face of the cartridge ring while the periphery of the cartridge is unobstructed for free insertion in a cylindrical bore or cavity.

The bearing unit 11a tilts in the cartridge ring 41 in the same manner as the bearing unit 11 tilts in the pillow block. The locking pins of both assemblies have the same function of holding the outer race ring against creeping in relation to the mounting ring.

The space 32 between the inner and outer race rings of the unit 11a is sealed by two slightly modified types of seals 51 and 52 of this invention. The seal 51 has a cylindrical outer periphery 51a snugly fitting a counterbore 27b of the outer race ring 27, a radial inner face 51b, a cylindrical inner bore 51c, a short radial outer face 51d, an inclined radial outer face 51e, and a reduced diameter outer peripheral portion 51f extending to a radial shoulder 51g. The ring 51 has the same grooves 35 and 36 as the seal ring 34.

The outer race ring 27 has a groove 53 in the bore 27a thereof adjacent the outer end of the ring and a locking ring 53a is snapped into this groove to project therefrom and form an abutment for the shoulder 51g. The counterbore 27c has a shoulder 27d bottoming the inner face 51b of the ring 51 to coact with the ring 53 in locking the sealing ring in the outer race ring 27.

The seal ring 52 is substantially identical with the ring 34 but has a peripheral groove 54 around the outer peripheral wall thereof. This groove 54 is aligned with a groove 55 in the outer race ring when the seal ring 52 is sufficiently inserted in the bore 27b of the race ring 27. A snap ring 56 of the resiliently expansible and contractible type is contracted in the groove 54 and expands into the groove 55 to span both grooves and lock the ring 52 to the race ring 27.

It will thus be understood that the rings 51 and 52 are identical with the ring 34 except for the modified arrangements for locking the rings to the outer race ring.

As illustrated in Figure 6, the seal rings of this invention have grooves 35 and 36 which fill up with lubricant and extraneous matter to form packing rings 60 and 61 projecting inwardly from the grooves to span the gap 37 between the inner race ring and the sealing ring and to have an interference fit relationship with the inner race ring. As indicated, lubricant 62 from the bearing chamber upon entering the gap 37 will soon be radially discharged by the rotating inner race ring to fill the first groove 35. This groove is closely adjacent the bearing chamber and fills as soon as the bearing is put in operation. The packing ring 60 is thereby quickly formed. Dirt particles 63 contacting the sloping outer face of the seal ring will cascade outwardly and away from the short radial outer face of the ring. This directs the dirt away from the gap 37 but if any dirt should enter the gap, it will quickly be centrifugally discharged into the second groove 36 thereby filling the groove and forming a packing ring 61. During continued operation of the bearing, some grease from the packing ring 60 will flow into the groove 36 to comingle with the dirt 61 and form a relatively hard packed mass. Conversely, some of the dirt may find its way inwardly to the groove 35 to coact with the grease and form a harder packing ring 60. The two packing rings 60 and 61 have a relatively light interference fit on the rotating inner bearing ring 21 so as not to impart friction to the bearing assembly, but at the same time, these rings form effective seals.

The bearing units of this invention are packed with a suitable grease that has sufficient flow characteristics during operation of the bearing to flow into the gap 37 and form at least one packing ring. Whenever it is desired to replace the rings 60 and 61, it is only necessary to charge the bearing chamber with a supply of grease under sufficient pressure to blow out the packing rings. New rings can thereupon be promptly formed. This is a very important feature of the invention since it provides for creation of new packings by a mere recharging of the bearing with lubricant under pressure. The pressure of the lubricant need not be carefully controlled because the gap 37 will always accommodate discharge of excess lubricant without permitting the build up of a sufficient pressure to blow out the seal rings.

The gap 37 between the inner race ring and the seal rings of this invention may vary from .0005 to .007 inch. A preferable clearance range for the gap 37 is .002 to .004 inch.

The bore of the seal rings of this invention should be long enough to accommodate a plurality of grooves and lengths of around a quarter of an inch have been found to be satisfactory.

The grooves to form the packing rings should be positioned and dimensioned to quickly fill up and develop the packing rings before much lubricant can be lost from the bearing chamber and especially before dirt can enter the bearing chamber. The first groove should be adjacent the inner face of the sealing ring so as to quickly receive grease from a bearing chamber while the other groove should be spaced inwardly from the outer face of the sealing ring so as not to attract dirt. The grease packing ring should fill up with grease before the dirt packing ring is developed. Grooves of from about .04 to .06 inch wide by about .05 to .07 inch deep have been found satisfactory with a preferred groove having a width range of .04 to .056 and a depth of .062.

The grease used for lubricating the bearing should be flowable under conditions of operation but should not be wholly liquid so as to drain out of the gaps 37 provided between the bearing seals and the inner race rings of the bearing prior to the creation of a packing ring in these seals.

As shown in Figure 7, a modified seal ring 70 of this invention, instead of having the press fit relation with the straight outer race ring bore like the seal ring 35 or retainer shoulders or grooves like the seal rings 51 and 52, can be provided with a shallow relatively wide groove 71 around its outer periphery. A flange 72 is provided at the outer end of the groove while a radial shoulder 73 is provided at the end of the groove. The periphery 74 of the seal ring inwardly from the shoulder 73 is tapered down to the diameter of the bore 27b of the outer race ring 27.

Lips such as 75 are provided on the bore 27b by forming tapered counterbores such as 76 in the bore. These counterbores extend radially and axially outward from the bore 27b to terminate at their deepest outer ends at radial shoulders such as 77.

The lips 75 need only be about 1/64 inch deep and the groove 71 should have a snug fit in the lip.

The seal ring 70 is press fitted into the ring with the tapered periphery 74 guiding the seal ring and spreading the bearing ring 27 until the shoulder 73 clears the shoulder 77 whereupon the lip will be seated in the groove 71 and the flange 72 and shoulder 73 will cooperate with the sides of the lip to hold the seal ring in position. If desired, the ring 70 can be cold shrunk or the ring 27 can be heat expanded or both, to facilitate press fitting of the ring 70 into locked relation with the lip 75 of the bearing ring 27.

From the above description, it should be understood that this invention provides bearing seals which form their own packing rings from the lubricant used for the bearing and the dirt or extraneous matter attempting to enter the bearing chamber. These packing rings can be replaced by merely forcing lubricant under pressure into the bearing chamber sufficiently to blow the packing rings out of the sealing ring grooves. While the sealing rings preferably have two grooves, in some instances one groove may be sufficient, and in other instances more than two grooves may be desirable. It is preferred, however, that at least one grease groove and at least one dirt groove be provided.

It will be understood that modifications and variations may be effected without departing from the scope of the novel concepts of the present invention.

I claim as my invention:

1. In an anti-friction bearing including inner and outer rings with anti-friction members therebetween, the combination with said inner and outer rings, of a one-piece sealing ring comprising a rigid annulus having a cylindrical outer periphery fitted in the outer ring, a cylindrical bore through said annulus sized to provide a gap of .0005 to .007 inch around the inner ring, a flat radial inner face on said annulus extending from said bore radially outward to said periphery of the annulus, a relatively short flat radial outer face on said annulus extending from the outer end of said bore, an inclined outer face extending from said relatively short flat radial outer face in an axially inward and radially outward direction to the periphery of the ring, a first circumferential groove in the bore of the annulus adjacent the radial inner face of the annulus adapted to receive and retain grease from the space between the inner and outer rings, a second circumferential groove in the bore of the annulus adjacent the relatively short flat radial outer face of the annulus adapted to receive and retain dirt entering the gap between the bore and inner ring, and said inclined outer face of the annulus being effective to cascade dirt particles outwardly and away from the relatively short flat radial outer face of the annulus to minimize entrance of dirt into the gap.

2. In an anti-friction bearing including inner and outer rings with anti-friction members therebetween, the combination with said inner and outer rings, of a rigid seal ring carried by the outer ring to seal off a space between the inner and outer rings, said seal ring spanning the space between the inner and outer rings and having a bore accommodating the inner ring to provide a close-running clearance gap between the seal ring and the inner ring of about .0005 to .007 inch in width, said bore of said seal ring having a first internal circumferential groove closely adjacent the space being sealed between the inner and outer rings, said bore of said seal ring also having an internal circumferential groove therein axially outward from said first groove and adjacent the outer face of the ring, said first and second grooves having a width of about .04 to about .06 inch, said outer face of the seal ring being inclined axially inward and radially outward at an angle of from about 10 to about 15 degrees from a radial plane for cascading dirt away from the entrance mouth to the gap between the bore of the seal ring and the inner ring, said gap accommodating flow of lubricant from the sealed off space between the inner and outer rings to said first groove, said first groove adapted to retain lubricant and form a packing ring projecting into said gap in interference relation with the inner ring, said second groove adapted to receive dirt entering said gap from the outer face of the seal ring together with grease from the packing ring for forming a relatively hard packing ring in interference relation with the inner ring.

References Cited in the file of this patent
UNITED STATES PATENTS

| | | |
|---|---|---|
| 1,738,984 | Brown | Dec. 10, 1929 |
| 1,747,745 | Venable | Feb. 18, 1930 |
| 2,017,731 | Pascoe | Oct. 15, 1935 |
| 2,052,108 | Okner et al. | Aug. 25, 1936 |
| 2,117,988 | Schock et al. | May 17, 1938 |
| 2,277,979 | Horger | Mar. 31, 1942 |
| 2,290,213 | Shafer | July 21, 1942 |
| 2,592,387 | Brown | Apr. 8, 1952 |
| 2,622,946 | McKissick et al. | Dec. 23, 1952 |

OTHER REFERENCES

Product Engineering, August 1954, page 172.